Feb. 3, 1959   R. T. BURNETT   2,871,990
COMBINATION DISC AND TRANSVERSE TYPE WHEEL BRAKE
Filed July 20, 1953   4 Sheets-Sheet 1

INVENTOR.
RICHARD T. BURNETT
BY Cecil J Arena
ATTORNEY

Feb. 3, 1959 R. T. BURNETT 2,871,990
COMBINATION DISC AND TRANSVERSE TYPE WHEEL BRAKE
Filed July 20, 1953 4 Sheets-Sheet 2

INVENTOR.
RICHARD T. BURNETT
BY Cecil J Arens
ATTORNEY

Feb. 3, 1959 R. T. BURNETT 2,871,990
COMBINATION DISC AND TRANSVERSE TYPE WHEEL BRAKE
Filed July 20, 1953 4 Sheets-Sheet 4

FIG. 7

INVENTOR.
RICHARD T. BURNETT
BY Cecil J Arens
ATTORNEY

United States Patent Office 2,871,990
Patented Feb. 3, 1959

2,871,990

COMBINATION DISC AND TRANSVERSE TYPE WHEEL BRAKE

Richard T. Burnett, South Bend, Ind., assignor to Bendix Aviation Corporation, South Bend, Ind., a corporation of Delaware Application July 20, 1953, Serial No. 369,197

28 Claims. (Cl. 188—70)

This invention relates to a brake assembly having either or both of the following attributes: engagement of one friction means is brought about as the result of engagement of another friction means and/or a plurality of rotor surfaces are engaged by friction means associated with a single stator unit.

An important object of this invention is to combine in a single brake assembly the best operating features of disc and drum (or shoe) brakes, obtaining the self-energization inherent in certain types of drum brakes, while avoiding the loss of pedal travel which results from drum expansion in conventional drum brakes.

Another important object of this invention is to obtain improved heat dissipation from the brake elements, with a consequent significant reduction of "fade" (i. e. loss of brake effectiveness). This is accomplished primarily as a result of an appreciable increase in the swept rotor area, obtained by utilizing both disc and cylindrical friction areas.

Among the other advantages obtained by using the present invention are: (a) increase of pedal ratio or decrease of pedal stroke made possible by reduced fluid displacement in the hydraulic actuator; (b) elimination of the need for initial brake adjustment; and (c) economical realization of the foregoing objects and advantages by means of a simple low-cost construction.

The braking art has utilized among others two distinct types of brakes—the "drum" (or "shoe") brake and the "disc" brake. Each of these distinct types has characteristic advantages which have determined the particular type used in a given instance. But the choice of one of these types is usually at the cost of foregoing the advantages of the other. Generally, the desirable characteristics of the disc brake are: low pedal travel loss during brake application; better heat dissipation with resultant reduction of the tendency to "fade" and simplification of the brake adjustment mechanism. On the other hand, the drum brake has the advantage of being able to provide greater self-energization, and therefore increased torque absorption for a given actuating pressure input. While this is a very generalized listing of the broad characteristics of the two different types of brakes it will be sufficient to emphasize the desirability of having the advantages of both types of braking in a single unit. In addition, part of the improvement of my brake operation stems from using a greater swept rotor area, that is, the area of the rotating member contacted by friction elements is increased by using both cylindrical and disc surfaces of the same rotor.

The above and other objects and features of the invention will appear more fully hereinafter from a consideration of the following description, taken in connection with the accompanying drawings, wherein a plurality of embodiments of the invention are illustrated by way of example.

Referring to the embodiment shown in Figures 1-4, a pair of friction units 10 and 12 are pivotally mounted on anchor members 14 and 16 which are secured to a support member 18 which in turn is fastened to a non-rotatable member, such as spindle 20, by a plurality of fastening members 22.

Figure 1:
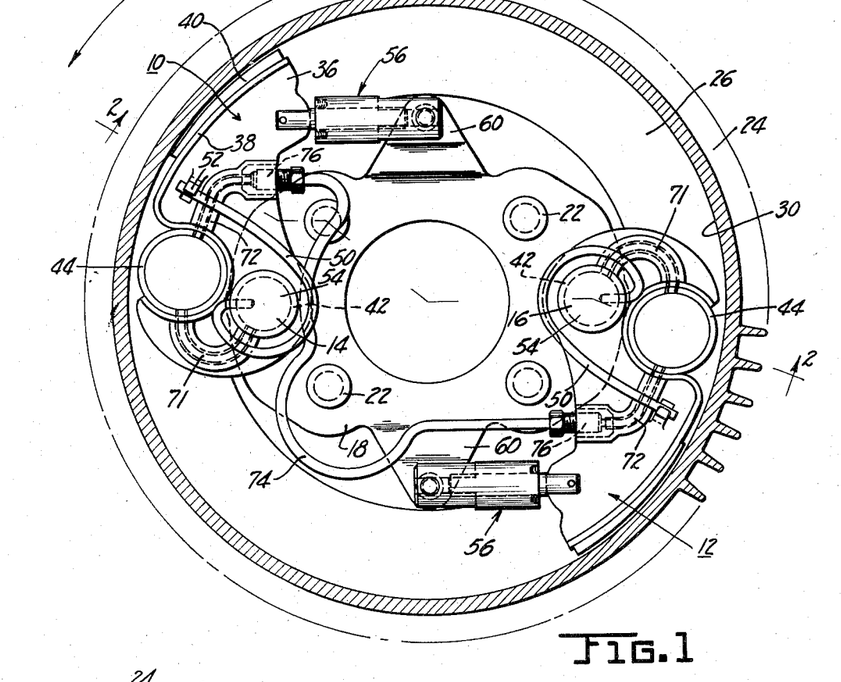
Figure 1 is a view looking in from the hub end of Figure 2 but with the hub removed and a portion of the drum cut away.
Figure 2:
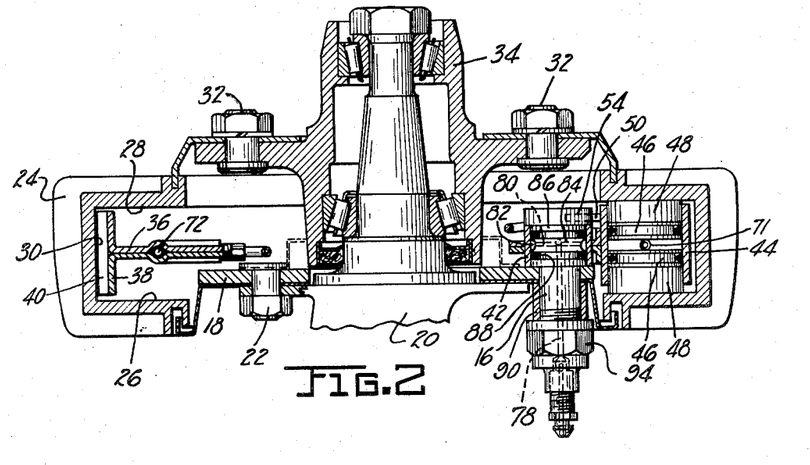
Figure 2 is a section taken on the line 2—2 of Figure 1.

The friction units 10 and 12 are adapted for engagement with a rotatable member 24 having axially spaced disc friction surfaces 26 and 28 joined by a substantially cylindrical internal friction surface 30. The rotatable member 24 is secured by a plurality of fastening members 32 to a rotating member such as hub 34.

Both of the friction units 10 and 12 are of identical construction thus eliminating any requirement for manufacturing "right hand" and "left hand" units. The units are interchangeable and this standardization obviously makes for economy of production. The following detailed description of one of the units applies equally to both.

Figure 3:
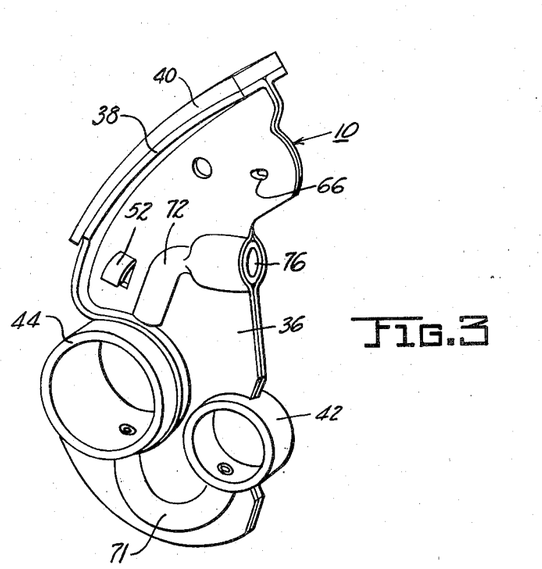
Figure 3 is a perspective view of a single friction unit.

The friction unit 10 includes a web portion 36 and rim 38 having friction material lining 40, the friction material lined rim forming a "shoe" portion of the unit 10. Perpendicularly mounted in the web 36 are a sleeve 42 and a cylinder 44, the sleeve 42 serving as a pivotal mounting for the friction unit 10.

Reciprocably mounted in the cylinder 44 are axially-movable, oppositely-acting piston members 46. The remote ends of the pistons are provided with friction material linings 48 for frictional engagement with the axially spaced disc surfaces 26 and 28 when the pistons are spread. The piston members 46 are illustrated as free floating. No return mechanism is included since "drag" on the rotating member 24 produced by engagement of the pistons with the disc surfaces 26 and 28 is negligible when the brake is released. Obviously a return mechanism can be included, as for example a suitable return spring.

For retracting the "shoe" portion of the friction unit 10 a torsion return spring 50 is used, the spring having one end bearing against an ear 52 formed from a struck-up portion of the web 36, and the other end positioned in the head 54 of the anchor 14. The torsion spring is pre-loaded to act in a direction tending to pivot the unit (and hence the "shoe" portion of the unit) to retracted position.

Figure 4:
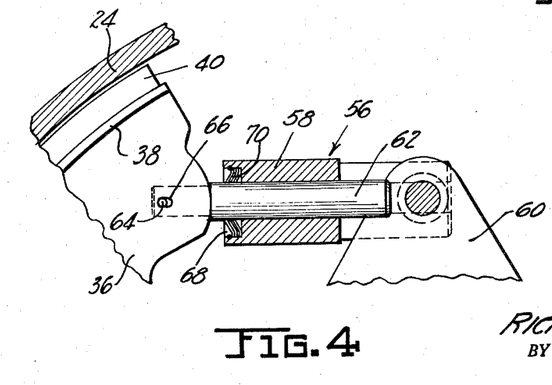
Figure 4 is an enlarged view of the automatic adjusting member with a portion shown in section.

The retracted position of the "shoe" portion of the unit is determined by automatic adjustor 56, one being provided for each of the units, the two adjustors being of identical construction.

The automatic adjusting device 56 includes a housing portion 58 connected to one of a pair of radially extending arms 60 of the support member 18, and a plunger 62 connected to the web 36 of the friction unit by a pin 64 extending through an oblong opening 66 in the web 36. At the end of the housing 58 adjacent the web 36, is a cavity 68 containing frusto-conical, toothed washers 70 encircling the plunger 62, thus permitting the plunger 62 to travel in one direction only. Opposite direction of movement of the plunger 62 is resisted by the frusto-conical washers 70 biting into the periphery of the plunger. The opening 66 is oblong in order to provide lost motion between the plunger 62 and the web 36. This lost motion determines the running clearance between the "shoe" portion of the friction unit 10 and the cylindrical surface of rotation 30. The automatic adjustor operates to maintain substantially the same running clearance of the "shoe" portion of the unit 10 from the cylindrical surface 30 regardless of the extent of wear of the lining 40.

The "shoe" portion of the unit forms an arc with an angle of approximately 30°. The length of this arc is varied within limits which permit the lining of the shoe to wear into complete contact with the cylindrical portion 30 of the rotating member 24, thereby eliminating the need for any initial adjustment of the friction unit. The length of the "shoe" portion of the unit, that is, the length of the arc, may be varied to affect the amount of brake applying force. The length of the arc of the "shoe" portion of the friction unit is important in determining the locking tendency of the brake, which depends upon the resultant of the forces actuating the brake and the reaction of the drum on the unit. When the resultant force of the brake applying force and drum reaction force passes through the anchor then the brake becomes in a locked condition. To offset locking tendency it is important to properly orient the forces causing this condition by various locations of the anchor and sizes of the arc of the "shoe" portion of the unit.

Assuming that the anchor is positioned as indicated, the length of the arc of the "shoe" portion may vary up to about 60°. Other relative locations of the anchor and the lengths of the shoe arc are possible without departing from the principles of the present invention, these brake locking considerations are only important for an understanding of the full scope of the invention.

The sleeve 42 and cylinder 44 are connected to a hydraulic system and a pressure creating device, not shown, via the anchor member 14 which provides inlet to the system. Hydraulic fluid leaves the system via anchor 16. Two hydraulic conduits 71 and 72 are formed in the webs 36 of each of the units 10 and 12 to provide fluid communication between sleeve 42 and cylinder 44, and to connect cylinder 44 with port 76. An external conduit 74 interconnects the ports 76 of the units 10 and 12.

It will be noted that the anchor members 14 and 16 are adapted to form a part of the hydraulic system in addition to serving as torque taking means. Therefore, each of the anchors 14 and 16 is provided with a centrally located passage 78 extending longitudinally through the anchor, and terminating in radially extending passages 80 which open into a chamber 82, the chamber 82 being defined by a part of the sleeve 42 of the friction unit and cylindrical flange 84 on the anchor having an annular groove therein. The head 54 of each of the anchors 14 and 16 is enlarged so as to abut one end of the sleeve 42. The anchor members 14 and 16 are each equipped with two longitudinally spaced circular flanges 86 fitted within the sleeve 42 of the respective friction unit. The flanges 86 serve to retain the sealing member 88 on either side of the grooved flange 84, making the chamber 82 a fluid tight chamber.

The anchors 14 and 16 are suitably secured to the support member 18, as best shown in Figure 2. Locating the anchors 14 and 16 toward the center of the brake assembly makes it possible to insert and remove these members without interference from the axially spaced sides 26, 28 of the rotatable drum 24. Positioning the anchors 14 and 16 close to the fastening members 22 has the effect of reducing bending moments and deflections in the support member 18; the support member 18 may therefore be small and of light construction. A bushing 90 is slipped over each of the anchors so that one end of the bushing rides against the support member and the other end of the bushing is engaged by a nut 94 which when screwed onto the anchor draws the flange 86 adjacent the support member thereagainst, thus clamping the support member between the bushing 90 and flange 86 to securely fasten the anchor in position.

The support member 18 is of such a construction that its diametral dimension does not extend within the envelope of the rotatable member 24. This facilitates removal of the friction units 10 and 12 and enables easier assembly of the brake onto the wheel.

Figure 5:
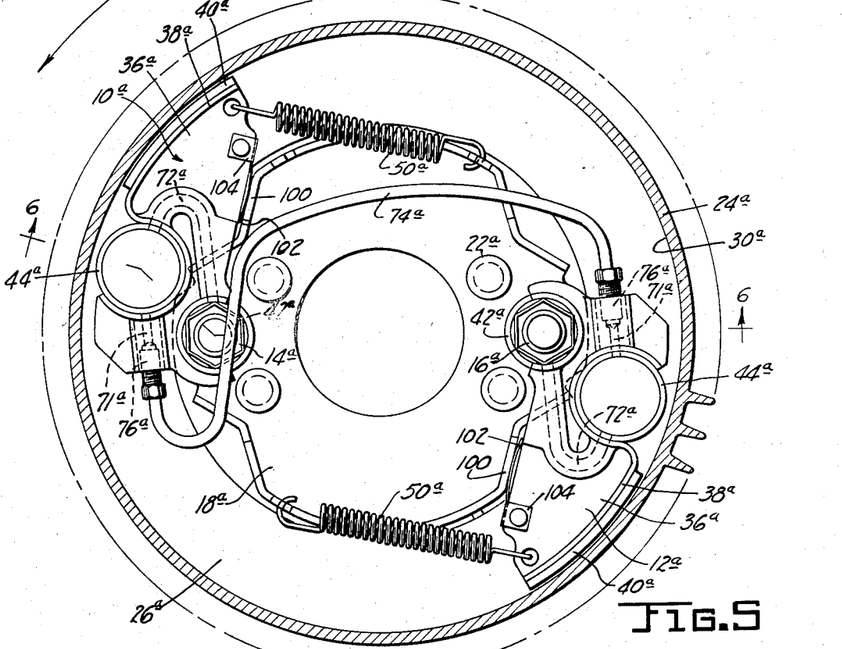
Figure 5 is a side elevation of a second embodiment of my invention.
Figure 6:
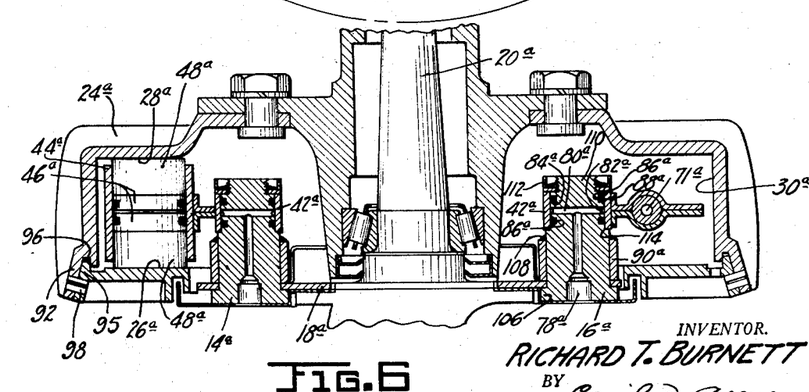
Figure 6 is a section taken on the line 6—6 of Figure 5.

In the description of Figures 5 and 6 which follows all parts of the brake assembly corresponding to those already mentioned are identified by the same reference numeral with the subscript a affixed thereto.

Two friction units 10a and 12a are pivotally mounted on anchor members 14a and 16a carried at diametrically opposite points on a support member 18a which in turn is secured to a nonrotatable member such as spindle 20a by fastening members 22a.

Rotatable member 24a has three friction element-engaging surfaces, namely two axially-spaced disc surfaces, 26a and 28a, joined by a substantially cylindrical internal surface 30a. The rotatable member 24a instead of being formed of one piece as shown in Figures 1 and 2 is constructed of two pieces, one resembling a conventional brake drum except for the flange 92, and the other being a flat ring with a peripheral flange 95 arranged in mating relationship to the flange 92 and engaging a groove 96 of the rotatable member 24a. The two pieces are secured together by a plurality of circumferentially spaced cylindrical fastening members 98. This novel construction simplifies assembly of the brake mechanism in that the friction units 10a and 12a may be assembled onto the support member 18a without the necessity of fitting the friction units into an annular envelope as where the integral three-sided rotatable member of the previous embodiment is employed.

The construction of the rotatable drum 24a is the subject of application Serial No. 434,846, filed June 7, 1954; it is disclosed herein only for purposes of illustrating the possibility of its use.

The friction units 10a and 12a each include a web portion 36a and rim 38a having friction material lining 40a. The friction material lined rim forms a "shoe" portion of the unit and will hereafter be referred to as such. Perpendicularly mounted in the web 36a are sleeve 42a and cylinder 44a. Reciprocably received in cylinder 44a are a pair of oppositely-acting, axially-reciprocable piston members 46a having friction material lining 48a on the faces thereof. The piston members 46a are of identical construction. The operation of the piston members 46a and the "shoe" portion of the friction unit is substantially the same as that of the embodiment shown in Figures 1 to 4.

The shoe portions of the friction units 10a and 12a are pivotally urged to retracted position out of frictional engagement with the drum by helical springs 50a. This retracted position is determined by engagement of the webs 36a of the respective units with a struck-up portion 100 of the support member 18a. Interposed between this struck-up portion 100 of the support member 18a and each web is a leaf spring 102 which is attached to the web 36a of the unit. It is a function of the leaf spring to prevent an audible click when the unit is returned to its retracted position; the leaf spring 102 also prevents distortion of the web 36a and struck-up portion 100 by cushioning the impact due to the rapid return of the friction unit under the action of the spring 50a. The leaf spring 102 is secured to the web by a clip portion 104.

As in the first embodiment, the anchor members 14a and 16a perform the dual function of anchoring the friction units and providing a part of the hydraulic system for the brakes. Hydraulic conduits 71a and 72a are formed integral with the web 36a of the friction unit to provide hydraulic fluid communication to and exit from the cylinder 44a wherein pistons 46a are reciprocably mounted for simultaneous actuation in opposite directions. An external conduit 74a interconnects the two ports 76a located at the periphery of the webs of the two units.

The construction of the anchor members 14a and 16a is different from that in the embodiment shown in Figures 1 and 2. For economy purposes the anchors 14a and 16a are of identical construction. The following description of one of said anchors applies equally to both. Anchor 16a contains a centrally located, longitudinally extending passage 78a terminating in radially extending passages 80a which open into chamber 82a, the chamber 82a being defined by a part of the sleeve 42a of the friction unit and cylindrical flange 84a of the anchor having an annular groove therein. The anchor member is equipped with two longitudinally spaced circular flanges 86a fitted within the sleeve 42a which serve to retain sealing members 88a on either side of the grooved flange 84a, making the chamber 82a a fluid tight chamber. One end of the anchor 16a is provided with a shoulder 106.

A bushing 90a is press fitted onto the anchor so that one end of the bushing is urged against the support member 18a, thus clamping the support member between the bushing and the shoulder 106 of the anchor. The bushing is then hydrogen brazed to the anchor at 108. The other end portion of the anchor 110 is of reduced diameter and externally threaded to receive a nut 112. The friction unit 10a is mounted on the anchor 14a and then the nut 112 is screwed into place against the end of the sleeve 42a to urge the other end into engagement with the shoulder 114.

The hydraulic actuating system is somewhat modified from that of the preceding embodiment; the peripherally located port 76a is situated closer to the center of rotation of the friction unit about the anchor 14a and disposed further from the rim of the friction unit. This location of the port 76a reduces the length of the arc through which it travels during operation of the brake and consequently, the external conduit means is not subjected to as much strain as in the previous embodiment. Therefore, a lesser degree of flexibility of the external conduit 74a is required.

Figure 7:
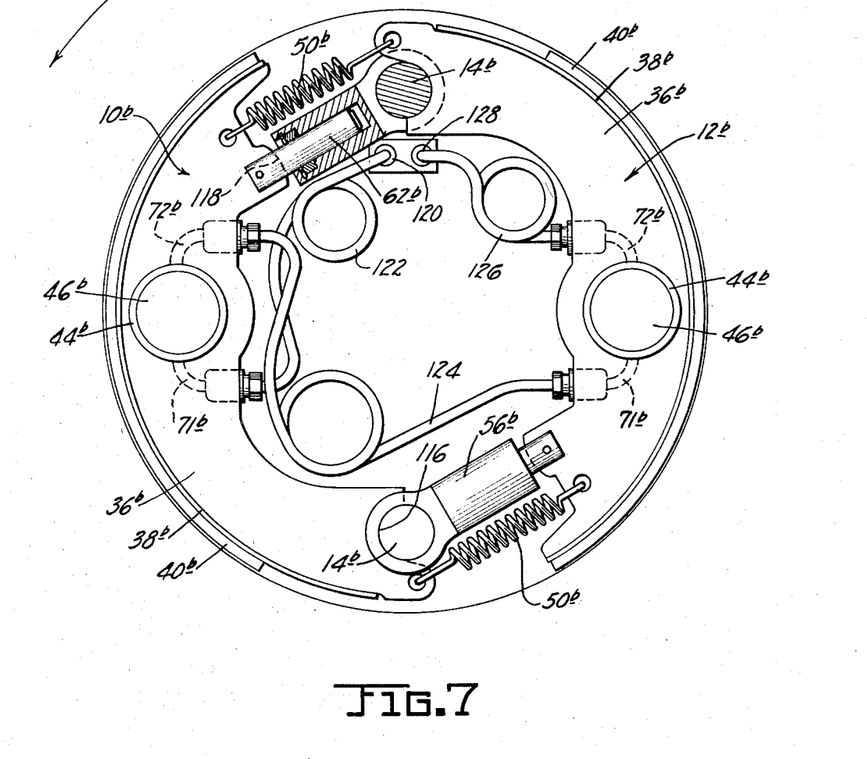
Figure 7 is a side elevation of a further embodiment of my invention.

Figure 7 illustrates a further embodiment of my invention. All parts which correspond to those previously mentioned will be given the same number with the subscript b affixed thereto.

Friction units 10b and 12b are free to pivot about either of a pair of non-rotatable anchor members 14b which are associated with each of the friction units. The identically constructed friction units each include a web portion 36b and a rim 38b to which friction material lining 40b is secured. Between the ends of the two units is situated a cylinder 44b perpendicularly mounted in the web 36b. Reciprocably received in the cylinder are hydraulically-actuated, oppositely-acting piston members 46b having friction material lining thereon as described in previous embodiments. The pistons are adapted to be actuated into engagement with two axially spaced disc surfaces of a rotatable member such as, for example, that described in Figures 2 and 6.

One end 116 of the friction unit 10b is concavely shaped for engagement with the anchor member 14b and is free to pivot about the anchor at this point. The other end 118 of the friction unit is convexly shaped and is engaged by a slotted portion of a plunger 62b of an automatic adjusting device 56b of the same type as before described. The friction unit is thus permitted to pivot about either of its opposite ends and is automatically adjustable to compensate for lining wear. Helical return springs 50b are interposed between the ends of the respective friction units for yieldably returning them to retracted position.

The hydraulic system for actuating piston members 46b of the brake assembly consists of an inlet port 120, hydraulic conduit 122, conduits 71b and 72b formed integrally with the web of the friction unit, conduit 124 interconnecting the units, and conduit 126 providing communication from the second friction unit to a bleed port 128. Each of the external conduits 122, 124, and 126 has expansion turns so that movement of the units will not subject the conduits and fittings to severe strain.

Each cylinder 44b is located between the ends of the friction unit so that the pistons 46b which produce pivotal actuation of the unit about either of its opposite ends will exert an applying force on the shoe portion of the unit in braking both directions of rotation.

Operation of the embodiment shown in Figures 1 to 4 is as follows: fluid pressure from a master cylinder source, not shown, is transmitted through the inlet port of the anchor member 14 and the centrally located passage 78 to the chamber 82 and thence to cylinder 44 in friction unit 10 by way of conduit 71. The external conduit 74 transmits fluid pressure from friction unit 10 to the second friction unit 12. The fluid pressure in each cylinder 44 spreads the two axially reciprocable pistons 46 into engagement with the disc surfaces 26 and 28 of the rotatable member 24. Assuming drum rotation in the direction of the arrow of Figure 1, the engagement of the friction material lining 48 of each friction unit with disc surfaces 26 and 28 will tend to pivot the entire friction unit in a counterclockwise direction about the respective anchor member, thereby moving the shoe portion of the unit outwardly against the cylindrical drum surface 30. When the operator's braking effort directly applies the pistons 46 against the disc surfaces 26 and 28 one of the effects of this braking is to produce the pivotal movement of each friction unit about the respective anchor member thus applying the second friction element of the brake unit—the "shoe" portion. The pistons 46 of each friction unit in addition to being braking elements are also applying means for a second friction element of the unit since the torque reaction from their application is utilized to produce pivotal actuation of the entire unit to accomplish the "shoe" braking.

The braking characteristics of the friction units include an admixture of "shoe" and "disc" braking qualities. The fact that the pistons 46 are the portion of the brake directly applied by the operator results in improved pedal characteristics i. e. low pedal travel required for actuation and avoidance of pedal travel loss because of drum expansion.

There is a tendency for conventional brakes having high self-energization to vary in effectiveness during the course of a braking cycle as a result of drum bellmouthing and changes in the coefficient of friction of the lining. With the present invention, applying effort delivered to the pistons 46 causes uniform braking which remains proportional to the applying effort throughout the braking cycle.

The brake unit thus combines the desirable characteristic of both "shoe" and "disc" braking. Each of the friction units 10 and 12 constitutes an individually self-energizing brake shoe, but yet inasmuch as the portion of the unit directly applied by the operator is the disc element of the unit there is no adverse effect on braking characteristics due to drum distortion. Braking by the friction unit is distributed between "shoe" and "disc" elements with the latter being utilized to bring about the "shoe" braking effort.

As previously mentioned, applying the brake is accomplished by generating fluid pressure in a master cylinder source (not shown) to cause frictional engagement of the pistons 46 with the disc surfaces 26, 28 of the rotatable drum 24. The characteristics of the brake, as far as pedal travel and pedal reaction (brake feel) are concerned, are related directly to the "disc" braking; the "shoe" braking is accomplished indirectly by the operator's applying effort insofar as it is the reaction of the disc braking which applies the "shoe" portion of the unit. No pedal travel is required on the part of the operator to take up any clearance of the shoe brake elements.

In inhibiting drum rotation in the direction indicated, all of the braking torque is absorbed by the anchor members 14 and 16. In braking the opposite direction of drum rotation, the piston members 46 upon engagement with disc surfaces 26 and 28 will tend to rotate each of the friction units 10 and 12 in a clockwise direction about their respective anchor members 14 and 16. The shoe portion of the units 10 and 12 is therefore pivoted away from engagement with the cylindrical surface 30, and consequently all of the braking must be effected by engagement of the pistons 46 with the disc surfaces 26 and 28. The braking torque in this case is distributed between the anchor members 14 and 16 and the adjusting mechanisms 56 associated with the friction units.

When the fluid pressure is released, each unit will be pivoted to retracted position by torsion return spring 50 which disengages the shoe portion of the friction unit from the cylindrical surface 30.

The braking effort of the friction elements in each unit is exerted on three surfaces 26, 28, and 30 of the rotatable member 24 in forward braking. Since the braking effort is expended over a greater surface and since the rotatable member 24 has a large swept rotor area, the heat energy which is generated during braking is more efficiently dissipated and the operating temperatures of the brake are very greatly reduced. The lower operating temperatures of the brake reduce the tendency of the brake to fade or lose effectiveness during the course of the stop. Fade is caused by a change in coefficient of friction of the lining, which tends to deteriorate under the influence of high temperatures. With the present invention fade in braking effectiveness is substantially eliminated, so that performance of the brake is not only stable throughout the course of the stop but is substantially the same over wide ranges of vehicle speeds. Thus the brake is substantially equally effective for braking higher as well as lower ranges of speed, and during the course of such braking the effectiveness of the brake will not diminish.

As an illustration of improved braking accomplished with the present invention, up to 10 consecutive 100 M. P. H. stops have been made in a vehicle in as rapid succession as possible with maximum acceleration between braking cycles, before fluid vaporization caused inoperability of the brake.

Each automatic adjusting device 56 operates in combination with the respective friction unit after the free motion between the opening 66 in the web and the pin 64 is taken up. The plunger 62 is then drawn through the housing 58 and washers 68. Since the washers 68 permit the plunger 62 to travel only in this direction the retracted position of the shoe portion of the unit is adjusted radially outwardly to compensate for lining wear. The clearance of the shoe portion from the cylindrical surface 30 is therefore maintained substantially constant throughout the wear life of the lining 40 and this clearance of the shoe portion from the rotatable member is equal to the lost motion between the adjustor and the web 36 of the friction unit.

The operation of the embodiment of Figures 5 and 6 is substantially the same as that of the first embodiment. Assuming drum rotation in the direction (counterclockwise) indicated by the arrow in Figure 5, fluid pressure transmitted to cylinder 44a via anchor 14a and integral conduit 72a will spread the oppositely acting pistons 46a into engagement with disc surfaces 26a and 28a to induce a counterclockwise pivotal actuation of the unit 10a about anchor member 14a. This counterclockwise pivotal actuation of the unit applies the shoe portion of the friction unit against the internal cylindrical surface 30a. Fluid pressure is transmitted from the cylinder 44a in unit 10a by external conduit 74a to cylinder 44a in the second unit 12a to effect simultaneously the same operation. All of the braking torque in the assumed direction is taken by the anchor members 14a and 16a associated with the friction units. When the brakes are applied with the drum rotating in opposite (clockwise) direction, only the pistons 46a are effective for braking, since the shoe portions of the friction units tend to pivot away from engagement with the cylindrical drum surface 30a. The braking torque in this instance is distributed between anchor member 14a and the struck-up portion 100 of the support member 18a (which is engaged by the web 36a).

The leaf spring 102 interposed between each web 36a and the struck-up portion 100 prevents slamming of the web 36a against the struck-up portion 100 with such force as will cause distortion of the web. The spring further serves to eliminate any objectional clicking noises. The clearance of the shoe portion of each friction unit from the cylindrical surface 30a is not maintained constant in this embodiment; this is not objectionable because the varying clearance cannot effect the pedal travel necessary to actuate the brakes (which is effected only by the travel of the piston members 46a). The "click" problem is alleviated by use of the leaf spring 63.

Helical springs 50a, interconnect the webs 36a of each friction unit and struck-up portions 100 of the support member 18a to retract the shoe portion of each friction unit from applied position by moving each friction unit about anchor members 14 and 16 in a clockwise direction.

A description of the operation of the embodiment in Figure 7 is as follows:

Assuming drum rotation in the direction indicated by the arrow in Figure 7, fluid pressure from an appropriate source (not shown) is introduced through inlet port 120 and transmitted by external conduits 122 and 124 and conduits 71b and 72b integral with friction units 10b and 12b to axially spread the two pairs of pistons 46b reciprocably mounted in the cylinders 44b. Conduit 126 interconnects cylinder 44b in one of the friction units with bleed port 128. Engagement of these piston members with the disc surfaces of the rotating member will tend to rotate the fraction units 10b and 12b in a counterclockwise direction about anchor members 14b. Rotation of the units 10b and 12b, induced by piston engagement with the disc surfaces, will radially apply the shoe portions of the friction units (comprising webs 36b, rims 38b and friction material linings 40b) against the cylindrical surface of the rotatable member.

The main difference of operation of this unit from the other embodiment is that, in braking when the drum is rotating in the reverse direction, the shoe portions of the friction units will be applied, as they are during forward rotation, the units in this situation, however, tending to rotate clockwise, anchoring on anchor pins 14b through the automatic adjusting devices 56b.

Each cylinder 44b is disposed an appreciable distance from each end of the respective unit in order to provide a substantial amount of "shoe" braking in either direction of drum rotation. The automatic adjusting mechanisms operate in the same manner as hereinbefore described; the lost motion between each adjustor and web of the respective shoe determines the running clearance of the shoe from the drum. The one-way plunger compensates for lining wear by establishing a different retracted position for the shoe as a function of lining wear, in order to maintain substantially the same running clearance between the shoe and the drum throughout the wear life of the unit.

From a consideration of the foregoing description it is apparent that I have secured the objects of the invention in part by utilizing two distinct types of braking in a single unit. By increasing the friction-element-engaging area of the rotating member, it has been possible to dissipate the heat more efficiently; consequently, I have been able to substantially eliminate fade or loss of brake effectiveness. By removing the effect of radial drum expansion on pedal travel requirements, I have substantially reduced pedal travel during brake application. At the same time by utilizing the torque reaction from the disc piston braking to apply the shoe portion of the unit, I obtain a suitable degree of self-energization of the brake. All these objects and results have been attained through use of a simple, economical mechanism having minimum servicing requirements.

Although only three embodiments of my invention have been described, it will be understood by those skilled in the art that the objects of the invention may be attained by the use of constructions different in certain respects from those disclosed without departing from the underlying principles of the invention.

I claim:

1. In cooperation with a rotatable drum of substantially U-shaped cross section, a brake assembly comprising a support member, a pair of composite disc and shoe brake units, a first and second anchoring means associated with each of said units, said units being pivotally mounted on said support member by said first anchoring means and including a web, a friction material lined rim formed along a segment of the periphery of said web, a cylinder perpendicularly mounted in said web intermediate said pivotal mounting portion and rim, and hydraulic conduit means integral with said web and interconnecting said first anchoring means and said cylinder, said integral conduit terminating at the periphery of said web, an external conduit interconnecting said conduit means integral with both of said units, a pair of oppositely-acting free-floating piston members reciprocably received in said cylinder and adapted to produce pivotal actuation of said unit about said first anchoring means to apply the rim portion of said unit during braking in one direction of rotation, said second anchoring means being operatively associated with the web portion of said unit to determine the retracted position of said unit and further being adapted to cooperate with said first anchoring means for braking during reverse direction of rotation, and return spring means for yieldably urging said unit to retracted position.

2. For use in cooperation with a rotatable member of substantially U-shaped cross section, a brake assembly comprising a support member, diametrically opposite first anchor means attached to said support member, a pair of composite disc and shoe friction units pivotally associated with said first anchor means and including hydraulically-actuated oppositely-acting first friction elements adapted to engage spaced apart sides of said rotatable member, second friction elements movable in a radially outwardly direction relative to the center of said support member according to pivotal movement of said friction unit for application against the cylindrical surface of said rotatable member during braking in one direction, and hydraulic conduit means integral with said units and connected to the pivotal mounting portions thereof to deliver fluid therefrom to the space between said first friction elements, external conduit means interconnecting said integral conduit means, return spring means operatively associated with each of said units to yieldably rotate said second friction elements to retracted position, and a second anchor means associated with each of said units and adapted to cooperate with said first anchor means during reverse braking, said first anchor means carrying the total braking load in forward braking and further providing an inlet passage for one of said units and a bleed passage for the other of said units.

3. For use in cooperation with a rotatable member having two disc-like parallel sides joined by a substantially cylindrical surface, a brake assembly comprising a support member, an anchoring means, a composite disc and shoe brake unit pivotally associated with said anchoring means and mounted between the parallel sides of the rotatable member, hydraulically-actuated first friction means mounted for reciprocable movement in said friction unit and adapted to engage the parallel sides of the rotatable member, a second friction element associated with said unit which is actuated radially outwardly relative to the center of rotation of said rotatable member to be applied against the cylindrical surface of the rotatable member, and return spring means operatively associated with said unit to retract said second friction element from engagement with the cylindrical surface of the rotatable member.

4. In cooperation with a rotatable member having two substantially flat parallel sides joined by an internal substantially cylindrical surface, a brake assembly including a support member, a pair of oppositely-located anchoring means associated with said support member, said anchoring means having passages therein, a composite disc and shoe brake unit pivotally associated with each of said anchoring means and mounted between the parallel sides of the rotatable member, each of said units including axially-reciprocable first friction producing means, a radially-outwardly actuated second friction means which is actuated by said first means, and a conduit integral with each of said units interconnecting the passages in said anchoring means and said first friction producing means and further providing hydraulic fluid outlet from said first friction means, and an external hydraulic conduit interconnecting the conduits integral with both of said units.

5. A brake assembly including a support member, a pair of oppositely-located first anchoring means fixedly secured to said support member, a second anchoring means formed from a portion of said support member, a friction unit pivotally associated with each of said first anchoring means and including an integral shoe portion and a fluid motor mounted with its axis parallel to the axis of pivotal movement of the unit, said fluid motor being located between said shoe portion and the pivot of the unit, a pair of friction-producing elements which are actuated by said fluid motor, the shoe portion of said unit being actuated by pivotally moving said unit, resilient means interposed between said unit and said second anchoring means to cushion the contact therebetween, and means for yieldably pivoting said unit into abutment with said second anchoring means.

6. For use in cooperation with a rotatable member having a substantially U-shaped cross section, a brake assembly including a support member, a pair of oppositely located anchoring means rigidly secured to said support member, a composite disc and shoe brake unit mounted for pivotal movement on each of said anchoring means and including hydraulically-actuated oppositely-acting first friction elements which are spread apart relatively to each other and said support member for application against spaced apart sides of said rotatable member, and a second friction element movable outwardly relative to the center of said support member and transversely to the line of action of said first friction element for application against the cylindrical surface of said rotatable member, said outward movement being obtained by rotation of said unit induced by application of said first friction elements against the rotatable member, and return spring means operatively associated with said brake unit for pivotally returning said second friction element to a retracted position.

7. For use in cooperation with a rotatable member having a substantially U-shaped cross section, a brake assembly including a support member, a pair of oppositely located anchoring means, a composite disc and shoe friction unit pivotally mounted on each of said anchoring means and including a fluid motor secured to said unit and movable therewith, a first friction means actuatable by said fluid motor for application against spaced apart sides of said rotatable member, and a second friction means actuated radially outward from the center of said support member during braking application to engage a substantially cylindrical inner surface of the rotatable member, and return spring means operatively associated with said friction unit to pivot said second friction means oppositely to the described pivotal movement for thereby moving said second friction means to a retracted position.

8. In cooperation with a rotatable member having a substantially U-shaped cross section, a brake system comprising a support member, a composite disc and shoe brake unit including spreadable disc brake elements which are moved apart on opposite sides of said support member and a shoe brake portion which is displaced in a radial direction outwardly from the center of said rotatable member, said disc elements and shoe portion to be applied respectively against the spaced sides and cylindrical surface of said rotatable member, a first anchoring means pivotally supporting said unit and providing resistance to the anchoring load for a combination of disc and shoe braking in one direction of rotation, and a second anchoring means providing automatic adjustment of said shoe portion responsively to wear thereof and further serving to cooperate with said first anchoring means during braking in the other direction of rotation.

9. In cooperation with a rotatable substantially U-shaped cross section member, a brake system comprising a support member, anchoring means fixedly attached to said support member, a composite disc and shoe friction unit pivotally associated with said anchor means, said composite unit including oppositely-acting first friction means which are forced apart during brake application into engagement with spaced sides of said rotatable member, second friction means which are forced in a radially outward direction relatively to the center of said support member for application against the cylindrical surface of said rotatable member, and hydraulic conduit means integral with said friction unit and providing hydraulic fluid communication to said first friction means.

10. A brake assembly comprising a rotatable member having two axially-spaced disc surfaces joined by a substantially cylindrical surface, a support member, and at least one friction unit pivotally mounted on said support member, said friction unit including a pair of oppositely-acting axially-reciprocable pistons and a shoe portion, said pistons being adapted to cause frictional engagement with the axially spaced disc surfaces of the rotatable member to produce pivotal movement of the friction unit whereby the shoe portion of said unit is radially outwardly applied against the substantially cylindrical surface of the rotatable member.

11. For use in cooperation with a rotatable member having two side surfaces joined by a substantially cylindrical surface, a brake assembly including anchoring means, a friction unit pivotally associated with said anchoring means, a first friction element of said unit axially actuated to contact the side surfaces of the rotatable member thereby causing the entire unit to pivot in the same direction as movement of the rotatable member and a second friction element of said unit which is applied by movement thereof away from the center of said rotatable member to become displaced therefrom in a radial sense and become engaged against the substantially cylindrical surface of the rotatable member by the pivotal actuation of said unit, said first friction element being located between said second friction element and the center of movement of the unit.

12. For use in cooperation with a rotatable member having a plurality of friction element engaging surfaces, a support member, anchoring means rigidly attached to said support member, a brake unit pivotally associated with said anchoring means, first friction elements of said unit which are thrust apart in opposite directions relative to said support member to contact surfaces of the rotatable member with the moment of their engagement with said rotatable member about said anchoring means to rotate said entire unit in the same direction of movement as the rotatable member, and a second friction element of said unit which moves outwardly from the center of said support member to become applied against a surface of the rotatable member by the pivotal actuation of said unit produced by said first friction element.

13. In cooperation with a rotatable member having two side disc surfaces joined by a substantially cylindrical surface, a brake system including anchoring means, a support member, a brake unit pivotally associated with said anchoring means, a first friction element of said unit including a fluid motor which is axially reciprocable to produce frictional contact with two side disc surfaces of the rotatable member, and a second friction element of said unit radially actuated to contact the substantially cylindrical surface of the rotatable member when the entire unit is pivotally actuated in the same direction as the rotatable member by said first friction element.

14. A brake unit comprising a web, an arcuate rim formed along a segment of the perimeter of said web, a portion of said web being adapted for pivotally mounting said unit, a cylinder substantially perpendicularly mounted in said web intermediate the rim and pivotal mounting portion, and a first and second conduit means integral with said web, said first conduit means connecting the pivotal mounting portion and cylinder, said second conduit means providing fluid communication with said cylinder and terminating at the periphery of said web.

15. A brake system comprising a rotatable U-shaped cross section drum, a nonrotatable support member and at least one friction unit, means pivotally mounting said friction unit on said nonrotatable support member, said friction unit including two friction members which are forced apart during actuation of the brake system to engage the spaced apart surfaces of said U-shaped cross-section drum so as to produce in one direction of drum rotation a displacement of a portion of said unit outwardly from the center of said rotatable drum to produce engagement of a portion of said unit against a cylindrical side of said drum, said portion of said unit being displaced toward the center of said drum during actuation of said unit when braking the opposite direction of drum rotation.

16. For use in cooperation with a rotatable member, a combination disc and shoe brake unit comprising a web, a transverse arcuate rim formed along a segment of the periphery of said web, a portion of said web adapted for pivotally mounting said unit, and an actuator cylinder substantially perpendicularly mounted in said web radially intermediate said rim and pivotal mounting portion.

17. A combination disc and shoe unit comprising a web, a friction material lined rim, a portion of said web adapted for pivotally associating said unit with a fixed abutment and an actuator cylinder substantially perpendicularly mounted in said web intermediate said rim and pivotal mounting portion.

18. A combination disc and shoe brake unit comprising a T-section shoe, and an actuator cylinder mounted substantially perpendicularly in the web of said shoe, a portion of said web adapted for pivotally associating said unit with a fixed member.

19. In a brake a composite disc and shoe unit comprising a web, a transverse friction-producing rim, an actuator cylinder substantially perpendicularly mounted in said web, and means for pivotally associating said unit with a fixed member, said cylinder being located between said rim and mounting means.

20. In cooperation with a rotatable substantially U-shaped cross section member, a brake system including a support member, anchoring means fixedly attached to said support member, a composite disk and shoe friction unit pivotally associated with said anchoring means, said composite unit including oppositely-acting reciprocable first friction means which are movable on opposite sides of said support member and are movable against spaced apart sides of said rotatable member, a second friction means which is displaceable outwardly from the center of said rotatable member to be applied against the cylindrical surface of said rotatable member, and a fluid motor cooperatively associated with said first friction means, said fluid motor being mounted in said unit and arranged for pivotal movement therewith.

21. In combination with a U-shaped cross section rotor a pivoted composite disc and shoe brake unit having the center thereof located radially intermediate the center of the rotatable member and the periphery thereof, said unit including oppositely-acting disc elements, and a radially applied shoe element, each of said elements being pivoted about the same center.

22. A composite disc and shoe friction unit comprising oppositely movable friction members which are spread apart relatively to each other, means for spreading apart said oppositely actuating friction members, a second friction member which is combined with said unit so that the engageable surface thereof lies in a plane transversely to the planes of said first friction members, and an anchoring means providing a pivot center for said oppositely-acting friction members.

23. A brake system including a support member, at least one composite disc and shoe friction unit, first anchoring means for said unit transversely received in said support member, said first anchoring means pivotally securing said unit to said support member for movement in a plane parallel to said support member and further serving to carry the entire anchoring load during pivotal movement of said unit in one direction, said unit consisting essentially of spreadable disc friction members which are movable apart transversely to the plane of pivotal movement of said unit and an arcuate friction member movable transversely to the direction of movement of said disc friction members, and second anchoring means formed from a portion of the support member and serving as an abutment surface for determining the extent of pivotal movement of said unit in a direction opposite to the described direction of movement.

24. For use in cooperation with a rotatable member, a brake assembly including anchoring means and a T-section composite disc and shoe unit pivotally mounted on said anchoring means, the disc element of said unit being located substantially between the shoe portion and pivot of the unit and adapted to be applied against a surface of said rotatable member in a direction perpendicular to the plane of pivotal movement of said unit, the shoe element of said unit being movable in the same plane as said unit and adapted for application against a second surface of said rotatable member when said unit pivots in one direction.

25. A friction unit including means for pivotally mounting said unit on a non-rotatable member, an arcuate shoe portion of said unit, a fluid motor carried by said unit intermediate the shoe portion and pivot of the unit and having its axis disposed parallel to the pivotal axis of said unit, and a disc element operatively connected to said fluid motor, said pivotal mounting means being adapted to serve as a fluid carrier for actuating said fluid motor.

26. In a brake, a fixed member, a combination disc and shoe brake unit pivotally secured to said fixed member, said unit including a T-section shoe portion and oppositely-acting disc elements reciprocably associated with said unit and located between said shoe portion and the pivot of said unit, and a second fixed member cooperable with said first fixed member to determine the extent of pivotal movement of said unit in one direction of movement.

27. For use in cooperation with a rotatable member having three friction-element-engaging sides, two of said sides being substantially parallel and the third side cylindrical, a brake assembly including a support member, a pair of first anchoring means carried by said support member, a composite disc and shoe brake unit pivotally associated with each of said first anchoring means, each of said units including oppositely-acting first friction means which are movable apart along a line parallel to the pivotal axis of the unit for application against the parallel sides of said rotatable member and second friction means which are movable in the plane of pivotal movement of said unit for application against the cylindrical surface of said rotatable member when said unit pivots in one direction, and a second anchoring means which is automatically extensible responsively to wear of said second friction means and operatively associated with each of said units to determine an adjustable retracted position for said second friction means.

28. In a brake, a fixed member, a composite disc and shoe brake unit pivoted on said fixed member at a point other than the center of the fixed member, said unit including a shoe element which is movable outwardly relative to the center of the fixed member when the unit pivots in one direction and two oppositely-applied disc friction elements which are reciprocably combined in said unit intermediate the shoe element and pivot of the unit, said disc elements being adapted for actuation along a line parallel to the pivotal axis of said unit, and anchoring means combined with said unit and fixed member to limit the movement of said unit when it pivots in the other direction.

References Cited in the file of this patent

UNITED STATES PATENTS

| | | |
|---|---|---|
| 1,865,524 | LaBrie | July 5, 1932 |
| 1,954,538 | Sanford | Apr. 10, 1934 |
| 1,967,382 | Taylor | July 24, 1934 |
| 2,043,516 | Ohliger | June 9, 1936 |
| 2,050,902 | Tatter | Aug. 11, 1936 |
| 2,602,525 | Jurgens | July 8, 1952 |
| 2,751,046 | Tack | June 19, 1956 |